UNITED STATES PATENT OFFICE.

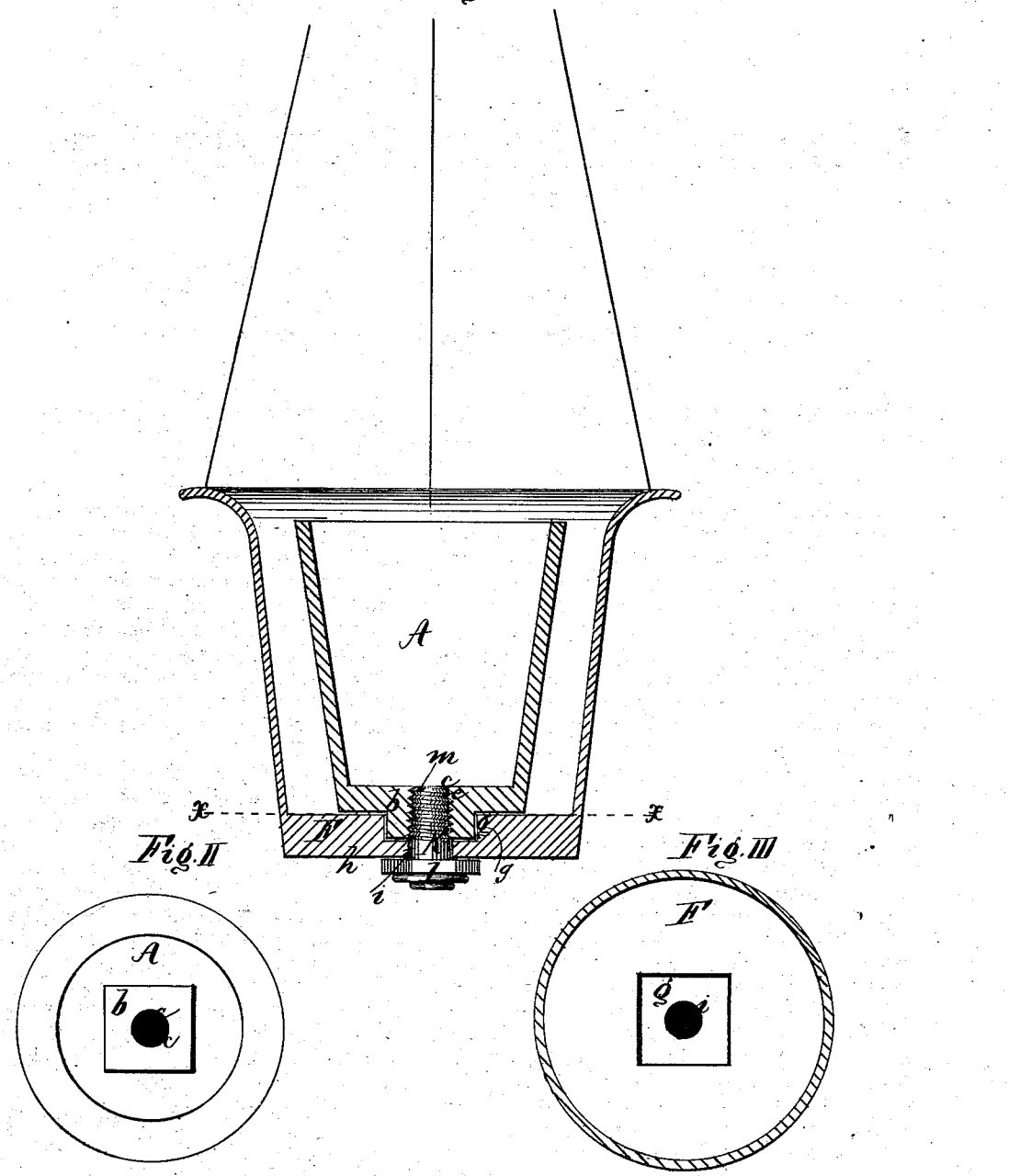
J. E. LANDERS.
Flower-Pots.
No. 155,525. Patented Sept. 29, 1874.
Witnesses:
Franklin Barritt.
Richard Gerner.
Inventor:
Joseph E. Landers.
Per,
Henry Gerner,
Atty.

JOSEPH E. LANDERS, OF NEW BEDFORD, MASSACHUSETTS.

IMPROVEMENT IN FLOWER-POTS.

Specification forming part of Letters Patent No. 155,525, dated September 29, 1874; application filed August 22, 1874.

*To all whom it may concern:*

Be it known that I, JOSEPH E. LANDERS, of New Bedford, Bristol county, State of Massachusetts, have invented certain Improvements in Flower-Pots, of which the following is a specification:

The object of my invention is to provide for a more easily manufactured fastening for holding the outer and inner pots together, which is also less liable to be broken than the fastening described in patent granted to me August 4, 1874, No. 153,715, for improvement in flower-pots.

My invention consists in making a recess in the inside of the bottom of the outer pot, in the center of which a hole is cut penetrating the bottom of the pot. In the outside bottom of the inner flower-pot is a projection, which fits into the recess in the bottom of the outer pot. In the center of this projection is cut a hole, which also penetrates the bottom of the flower-pot. This hole is threaded. The projection, as well as the recess, may be made of a square, round, or any other desirable form. After the flower-pot is placed in the outer pot, with the projection fitting into the recess, a round wooden threaded plug, with an ornamental head, is inserted in both holes, penetrating the bottom of the pots, by which means the pots are securely fastened together.

The hole in the bottom of the outer pot also serves to remove the earth or refuse which may happen to become collected in the recess.

In order to describe my invention more fully, I refer to the accompanying drawing forming a part of this specification.

Figure I is a vertical section of my improved flower-pot. Fig. II is a detached bottom view of the inner flower-pot. Fig. III is a plan sectional view of the outer pot, taken on the line $x\ x$, Fig. I.

A is the inner flower-pot, with projection $b$. $c$ is the hole cut through the center of the bottom $d$ and projection $b$ of the pot A, and provided with screw-threads $e$. F is the outer pot, with recess $g$. In the bottom $h$ of this pot is cut a hole, $i$. K is the wooden plug, with head $l$, and provided with screw-threads $m$.

Having described my invention, I desire to claim—

The flower-pot A with projection $b$, and hole $c$ with screw-threads $e$, in combination with pot F with recess $g$, hole $i$, and plug K with head $l$ and threads $m$, substantially as and for the purpose described.

JOSEPH EDWARD LANDERS.

Witnesses:
 RICHARD GERNER,
 FRANKLIN BARRITT.